April 30, 1929.  E. P. BORMAN  1,710,808
ELASTIC TIRE COVER
Filed May 31, 1927
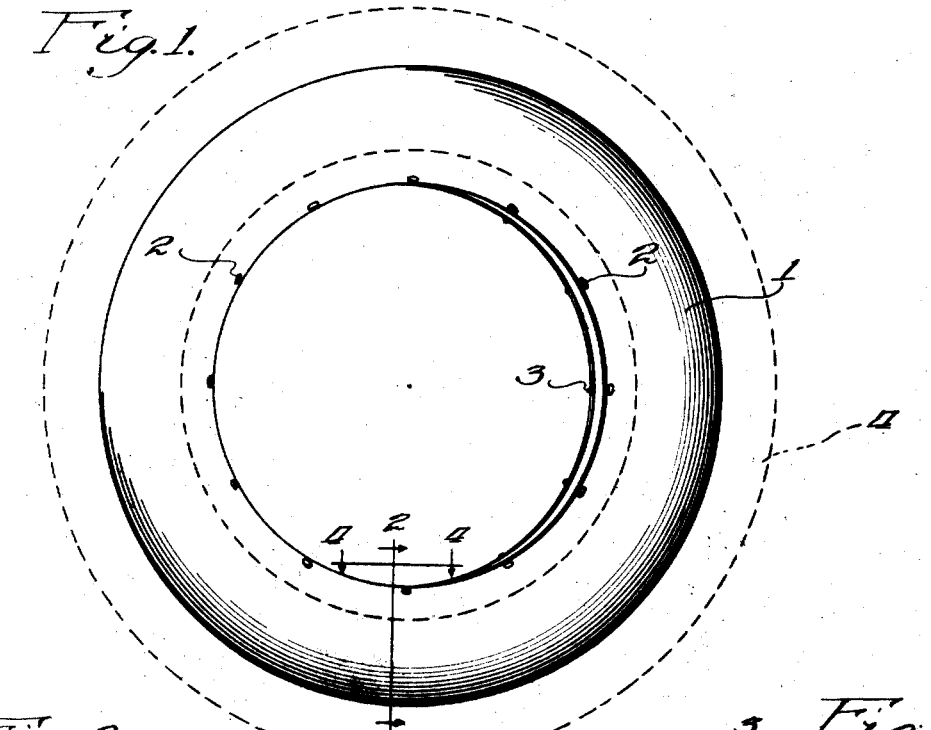
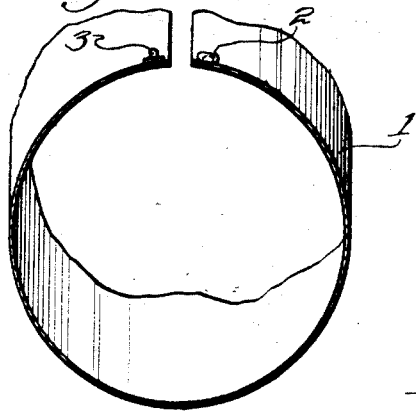
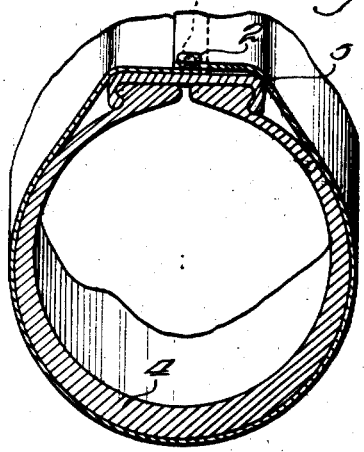
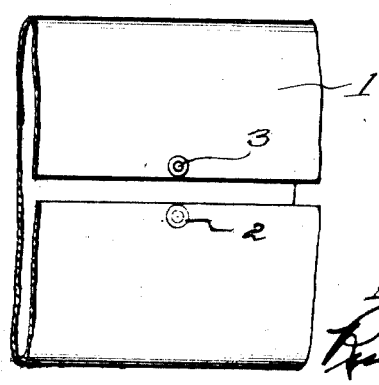
Witnesses.
Arthur M. Franke,
Adolph F. Berg
Inventor:
Emil P. Borman
Rummler & Rummler,
Attys.

Patented Apr. 30, 1929.

1,710,808

UNITED STATES PATENT OFFICE.

EMIL P. BORMAN, OF CHICAGO, ILLINOIS.

ELASTIC TIRE COVER.

Application filed May 31, 1927. Serial No. 195,446.

This invention relates to tire covers for the protection of spare tire casings carried on motor vehicles.

The main objects of this invention are to provide an improved form of tire cover; to provide a tire cover which will fit so snugly that water and mud will be excluded; and to provide an improved form of tire cover which will not shrink, rot or easily tear.

An illustrative embodiment of the invention is shown in the accompanying drawings, wherein:

Fig. 1 is a plan view of the improved cover, and its relative normal size as compared with the tire it is designed to protect, which is shown in dotted lines.

Fig. 2 is a section taken on the line 2—2 of Fig. 1.

Fig. 3 is a cross sectional view showing the cover in position on a tire.

Fig. 4 is a fragmentary detail view from the line 4—4 of Fig. 1.

Heretofore, tire covers have for the most part been made of cloth or other fabric which tends to shrink after the cover has been exposed to water. After tire covers have thus become wet a number of times, the fabric rots and is often torn when it is attempted to assemble the cover on the tire to be protected. The material is non-elastic and snug fits are difficult to obtain. Water tight fits are not possible with such covers.

The above objections have been overcome by providing a cover which is an elastic, unitary cover. The cover is circumferentially smaller and cross sectionally smaller, than the tire it is designed to protect.

The tire cover shown in the drawings comprises a tube 1, preferably of elastic rubber, circular in form and split longitudinally about its internal periphery. The marginal edges of the tire cover are provided with snaps 2 and coacting fasteners 3 spaced apart for providing means for securing the tire cover around the tire.

In assembling the cover on the tire 4 which is held on the rim 5, it is necessary to stretch the cover both circumferentially and cross sectionally, and when secured around the tire by means of the snaps and their coacting fasteners, a water-tight fit is secured and the difficulties of shrinkage, rotting and tearing are done away with.

By stretching the tire cover circumferentially is meant stretching it in the plane of the cover and tire upon which it is applied as shown in dotted outline in Figure 1. By stretching the cover in cross sectional diameter is meant that when the cover is applied to a tire the inner peripheral edges of the cover to which the fastening means are attached are in spaced relation, and in order to fasten the edges together it has to be stretched in a plane transverse to the plane of the tire as shown in Figure 3.

While but one specific embodiment of this invention has been herein shown and described, it will be understood that details of the construction shown may be altered or omitted without departing from the spirit of this invention as defined by the following claims.

I claim:

1. A spare tire cover comprising a circular tube of integrally formed material, the entire area of which is substantially uniform elasticity; said tube being open around its inner periphery for assembling on the tire, said tube being circumferentially smaller, and smaller in cross sectional diameter than the tire to be covered, so that said tube will have substantially uniform water-excluding contact with the tire when assembled thereon, and co-acting means on the inner peripheral edges adjacent said opening for detachably securing said edges together.

2. A spare tire cover comprising a circular tube of integrally formed material, the entire area of which has substantially uniform elasticity; said tube being open around its inner periphery for assembling on the tire, said tube being circumferentially smaller, and smaller in cross sectional diameter than the tire to be covered, so that said tube will have substantially uniform water-excluding contact with the tire when assembled thereon, and co-acting means on the inner peripheral edges adjacent said opening for detachably securing said edges in over-lapping relationship.

Signed at Chicago this 28 day of May, 1927.

EMIL P. BORMAN.